(12) United States Patent
Lewis

(10) Patent No.: US 11,731,861 B2
(45) Date of Patent: Aug. 22, 2023

(54) SAFELY OVERLOAD LINK

(71) Applicant: Mitchell Lee Lewis, Townsville (AU)

(72) Inventor: Mitchell Lee Lewis, Townsville (AU)

( * ) Notice: Subject to any disclaimer, the term of this patent is extended or adjusted under 35 U.S.C. 154(b) by 254 days.

(21) Appl. No.: 16/633,513

(22) PCT Filed: Jul. 30, 2018

(86) PCT No.: PCT/AU2018/050789
§ 371 (c)(1),
(2) Date: Jan. 23, 2020

(87) PCT Pub. No.: WO2019/023742
PCT Pub. Date: Feb. 7, 2019

(65) Prior Publication Data
US 2021/0130140 A1 May 6, 2021

(30) Foreign Application Priority Data

Jul. 31, 2017 (AU) ................ 2017903020

(51) Int. Cl.
*B66C 15/00* (2006.01)
*B66C 1/12* (2006.01)
(Continued)

(52) U.S. Cl.
CPC .............. *B66C 15/00* (2013.01); *B66C 1/125* (2013.01); *F16G 13/12* (2013.01); *F16G 13/18* (2013.01); *G01L 5/0071* (2013.01)

(58) Field of Classification Search
CPC ......... B66C 15/00; B66C 1/125; F16G 13/18; G01L 5/0071
See application file for complete search history.

(56) References Cited

U.S. PATENT DOCUMENTS 3,077,178 A * 2/1963 Gordon ................... F16G 13/14
73/862.642
3,885,428 A 5/1975 Dalferth
(Continued)

FOREIGN PATENT DOCUMENTS

DE   3304289 A1   8/1984
GB   1366108      9/1974
(Continued)

OTHER PUBLICATIONS

International Search Report in corresponding PCT application No. PCT/AU2018/050789, dated Oct. 29, 2018, pp. 5.
(Continued)

*Primary Examiner* — Manuel A Rivera Vargas
(74) *Attorney, Agent, or Firm* — Tredecim LLC; Sean L. Sweeney

(57) ABSTRACT

The invention relates to a safety link for use in lifting, winching, towing or securing apparatus or similar. The safety link including, a first connection point, a second connection point, and an indicator means positioned substantially between and associated with the first connection point and the second connection point. If an overload force is applied, the forces between the first connection point and the second connection point cause a change in the indicator means, whereby the change indicates the overload to the user so safety checks may be conducted. The invention also relates to a method of use.

14 Claims, 4 Drawing Sheets

(51) Int. Cl.
*F16G 13/12* (2006.01)
*F16G 13/18* (2006.01)
*G01L 5/00* (2006.01)

(56) References Cited

U.S. PATENT DOCUMENTS

| | | | |
|---|---|---|---|
| 5,174,401 | A | 12/1992 | Casebolt |
| 5,922,996 | A | 7/1999 | Ryeczek |
| 6,292,101 | B1 | 9/2001 | Stoltz et al. |
| 2008/0121170 | A1* | 5/2008 | Larsen .................. G01L 5/101 73/862.392 |
| 2008/0136204 | A1* | 6/2008 | Malapati .............. B60N 2/2809 296/68.1 |
| 2011/0226928 | A1 | 9/2011 | Groeneveld et al. |
| 2013/0298726 | A1* | 11/2013 | Diekhoff ................. B62D 7/20 74/579 R |
| 2017/0030813 | A1 | 2/2017 | Myers et al. |

FOREIGN PATENT DOCUMENTS

| | | |
|---|---|---|
| GB | 1452705 | 10/1976 |
| GB | 2444591 A | 6/2008 |
| WO | 2008007961 | 1/2008 |

OTHER PUBLICATIONS

Written Opinion in corresponding PCT application No. PCT/AU2018/050789, dated Oct. 29, 2018, pp. 8.
International Preliminary Report on Patentability in corresponding PCT application No. PCT/AU2018/050789, dated Jul. 3, 2019, pp. 60.
Supplemental European Search Report in related application EP 18841563.2, dated Jul. 23, 2020, 1 pp.
Examination report in corresponding application EP 18841563.2, dated Sep. 14, 2020, 3 pp.
Machine translation of reference DE3304289 Abstract, 1 pp.
Machine translation of reference DE3304289 Description, 2 pp.
Search Report in related application CN 201880054997, dated Mar. 23, 2021, 2 pp.
Office Action in related application CN 201880054997, dated Mar. 30, 2021, 5 pp.
Best available translation of Mar. 30, 2021, Office Action in related application CN 201880054997, 7 pp.
Office Action in related application CN 201880054997, Dec. 3, 2021, 5 pp.
Best available translation of Dec. 3, 2021, Office Action in related application CN 201880054997, 7 pp.

* cited by examiner

SAFELY OVERLOAD LINK

FIELD OF THE INVENTION

The present invention relates to a safety overload link, and in particular to safety overload link for use in lifting, winching, towing or securing apparatus or similar of objects.

BACKGROUND OF THE INVENTION

In any industrial or construction applications lifting chains, slings or cables are used to lift, winch, tow or generally secure heavy objects. Lifting, winching, towing or securing apparatus or similar of heavy objects also occurs regularly in many industries, including commercial, the shipping industry, mine sites, and in agriculture, as just a few examples. The heavy objects are generally attached through use of the arrangement of steel chain links to machinery for lifting, up carrying to another position. For example, on a construction site preformed pieces of concrete may be moved in this manner, or blocks from one position to another on the site.

At present, the integrity of the chain links are checked by looking, to see if any of these are visibly stretched or damaged chain links. If there is no damage visible but damage is suspected or as part of a regular check the equipment must be removed and sent away for imaging to look for internal damage. Where a load lifted has been too heavy for the apparatus and stretched one or more chain links, if this is discernible from the outside the only way to is by looking at the links, and seeing if there has been some deformation. The deformation may be very slight, very difficult to see, or may not be visible at all where the damage is sustained internally. However, the overloading of the chain links presents a significant danger, as it may mean that the chain links would fail and break if used to lift another heavy load. In this case, the failure of the apparatus will not be expected, as the apparatus has lifted similar loads previously and this false confidence increases the chances of a dangerous accident occurring. Therefore, at present, where a chain links or lifting, winching, towing or securing apparatus or similar apparatus has been overloaded it is possible that there is no visible sign that this has occurred, so no indication to the users that there may be a weakness in the equipment that may lead to a future fault or failure on a subsequently lift. Other than the highly disruptive activity of removing the apparatus and having it thoroughly checked up close and through use of imaging, typically requiring the apparatus to be sent away, the apparatus appears safe but could be set to fail at the next use.

The safety and lives of the workers is at serious risk, should there be such a failure of the lifting, winching, towing or securing apparatus or similar equipment. Similarly, the public may be endangered if lifting, winching, towing or securing apparatus or similar equipment is at risk of causing an accident, which may impact beyond the immediate work site. To avoid such safety issues the lifting, winching, towing or securing apparatus or similar apparatus and the chain links should be regularly and thoroughly checked, to look for damage or lose of integrity. The necessary checks are not always carried out or not carried out with sufficient regularity or care, but these checks are essential to avoid the high and significant risks. Even if the visual checks are carefully made, where a heavy load has stretched a link the stretch may be difficult or impossible to see. The apparatus may have dust or dirt on it that obscures the damage or the damage may not manifest or only slightly on the outside of the apparatus. In this case it would not be until the link fails and the inside checked through imagery that it will be painfully clear that the link is seriously compromised. An operator may believe that the apparatus is safe, but an overload has occurred, weakening the apparatus. It may be that a previous operator may be aware that something happened earlier but when the new operator comes on shift, there will be no warning that there may be danger. Where this overloading has not be seen or recognised on the apparatus the operator will be none the wiser and will use the apparatus as usual, until unexpected failure occurs, an extremely dangerous situation.

The inventor, has through long and careful development, invented a very clever new safety link for use with lifting, winching, towing or securing apparatus or similar equipment that readily enables users to see or otherwise determine that the apparatus has been previously overloaded. The overload or safety link shows the user that an overload has occurred, that damage may be indicated, and safety checks should be made to the equipment. The overload can also be loading too quickly or otherwise compromised in terms of on-going use due to deformation of chain links. For safety, once the overload is known about then the suitable safety checks and maintenance can be made and ensure that the apparatus is safe to use and lift before proceeding. Before the invention, the overload may be known about but the damage may not be clear, and certainly not clear to another operator until it fails again on another load. The improved safety implications of the invention are significant, which in turn saves time and money at the dangerous construction or mine site, or a port for example where the invention may be used. Avoiding accidents is a must but is also good economic sense as the loss of time where an accident must be accessed of apparatus fully accessed compared to ongoing checks and maintenance is significant. It is likely that once the invention becomes known about it will be universally adopted due to the clear advantages of the clear indication and advantages for safety. There is no compromise in the manner in which the equipment is used, simply the safety of the site is improved dramatically by use of this surprisingly clever and useful invention.

The following describes a non-limiting example of the invention being used with reference to a safety link for use with lifting, winching, towing or securing apparatus or similar apparatus, such as used in industry or construction. The inventor has developed a very useful and versatile safety link that may be used in a wide range of applications in many fields and forms. It is not intended that the safety link be limited in its application in any way other than as indicated in the claims. It is not intended that the safety link invention be limited to the described lifting, apparatus, it may be used for any lifting, winching, towing or securing apparatus or similar, winching, towing or securing apparatus or similar. The invention may be used in any suitable arrangement where the indication of undue forces or stresses applied may be useful to be indicated. For example, the apparatus may be used in transport, lifts, construction, commercial applications, shipping, or other transportation, or domestic applications.

For clarity, any prior art referred to herein, does not constitute an admission that the prior art forms part of the common general knowledge, in Australia or elsewhere.

It is an object of the present invention to provide a safety link that at least ameliorates one or more of the aforementioned problems of the prior art. It is a further and separate object of the invention to provide a method of use of a safety link that at least ameliorates one or more of the aforementioned problems of the prior art.

DISCLOSURE OF THE INVENTION

Accordingly, the present invention provides a safety link for use in lifting, winching, towing or securing apparatus or similar, the safety link including:
- a first connection point;
- a second connection point;
- an indicator means positioned substantially between and associated with the first connection point and the second connection point, wherein, where an overload force is applied, the forces between the first connection point and the second connection point cause a change in the indicator means whereby the change indicates the overload to the user so safety checks may be conducted.

Accordingly, the invention also provides a safety link for use in lifting, winching, towing or securing apparatus or similar, the safety link including:
- a first connection point;
- a second connection point;
- an indicator means positioned substantially between and associated with the first connection point and the second connection point, wherein, the first connection point and second connection point together form substantially a single piece, arranged to include an overlaying part, part of the indicator means, and the overlaying part deforms on overloading beyond the predetermined "overload" limit such that the deformed shape may provide a visual indicator that an overload has occurred, and the indication means, including the overlaying part, indicates an overload to the apparatus so safety checks may be conducted.

Preferably, the safety link is a safety link used with other apparatus to indicate an overload has occurred. The overload may be any undue stress, not limited to a literal use with too heavy a load. The safety link may be used with any suitable apparatus. The safety link may be used with any suitable lifting, winching, towing or securing apparatus or similar apparatus. The safety link may be used for any suitable lifting, winching, towing or securing apparatus or similar apparatus. The safety link may be used in an industry chosen from the group: construction; industry; mining; shipping; trains; transport generally; commercial applications; or domestic applications.

The safety link may take any suitable form. In one form of the invention the safety link is configured to deform when overloaded. This deformation, and other features may form part of the indicator means. In other forms of the invention the overload may stretch or separate parts of the apparatus in other ways so that the indicator means shows that the overload has occurred. In all of these forms of the invention, overload is applied pulling apart or separating the first and second parts and this overload and separation causes the indicator means to show the overload. If a load or force is applied that does not overload the apparatus the load will be lifted, the safety link will then be part of the lifting, winching, towing or securing apparatus or similar apparatus and unchanged. It is only when overloaded that the safety link is designed to separate, or deform and showed that the damaging load has been lifted. Similarly, if the load has been lifted too quickly and any slack in the chain cable or sling has been taken up too suddenly causing hit to overload even if the load is within safe working limits as the shock load would cause the apparatus to overload.

Most preferably, the safety link can be installed to apparatus without interfering with the usual use of the apparatus, but on overload the safety link provides a clear indication that the overload has occurred and that safety checks should be conducted. Most preferably, the safety link may be retrofitted to apparatus without the need for adaptation. For example, a safety link of the invention may be installed between the lifting, winching, towing or securing apparatus or similar chain links and the chain links of the machine to lift to provide the overload warning. In other forms of the invention the overload link or safety link may be provided with the apparatus by the manufacturer.

The safety link may be made of any suitable material or combination of materials. The nature of the use of the safety link is such that it should be made of a strong material, and typically would be made of a strong metal. The safety link should be adapted to indicate the overload before failure of the apparatus. The safety link apparatus may be made of materials of a different tensile strength than the remainder of the apparatus. However, the important features is that the chain links work to lift the apparatus but deform or separate on "overload".

The lifting, winching, towing or securing apparatus or similar may be any suitable lifting, winching, towing or securing apparatus or similar. For example, the lifting, winching, towing or securing apparatus or similar may be lifting, winching, towing or securing apparatus or similar at a port to lift cargo onto a ship. The lifting, winching, towing or securing apparatus or similar may be to lift containers. The lifting, winching, towing or securing apparatus or similar may be at a construction site. The lifting, winching, towing or securing apparatus or similar may be to lift materials at a construction site. The lifting, winching, towing or securing apparatus or similar may be lifting, winching, towing or securing apparatus or similar at a mine site. The lifting, winching, towing or securing apparatus or similar may be of large volumes of ore or other mined product.

The lifting, winching, towing or securing apparatus or similar may be by a machine or crane. The lifting, winching, towing or securing apparatus or similar may include chain links or a cradle. Preferably, the load is attached to chain links or a cradle. Preferably, the lifting, winching, towing or securing apparatus or similar is achieved through a load bearing machine. Most preferably, the load is attached to lifting, winching, towing or securing apparatus or similar equipment and a load bearing machine lifts the load. Most preferably, the lifting, winching, towing or securing apparatus or similar equipment includes chain links and the chain links are attached to the second connection point and the safety chain links is connected to the chain links of a load bearing machine at the first connection point, whereby the safety link is positioned between the load and the load lifting, winching, towing or securing apparatus or similar machine so that if overloaded the safety link will indicate this, to enable safety checks to be conducted. It is typical for chain links to be used around the load and from the crane or machine for lifting, winching, towing or securing apparatus or similar. In this case the first connection point may be attached to a chain links and the second connection point may be attached to a chain links. The chain links may be replaced by other suitable parts, not limited to chain links. There may be multiple chain links or equivalents. There may be multiple safety links installed at different parts of the apparatus to monitor for overload. Or there may be a single overload safety link at the point of greatest force, between the lifting, winching, towing or securing apparatus or similar apparatus and the cradle holding the load. The lifting may include chains. The lifting may include securing. The lifting may include cable slings for securing apparatus. The lifting maybe by a machine or crane. There may be pulling by winching or towing. The securing may be of heavy loads, such as cargo and transport. The lifting may include stay wires, cables, on sailing vessels-rigging, or anywhere else cables may be include to lift, pull or secure. High tension power lines may be used with the invention to indicate where an overload or stress has been applied. There is no need for the apparatus to be sent away for specialised inspection thus saving on downtime and taking out any guesswork when it comes to safety. The safety link can be considered as a good "traffic light indicator", red-stop unsafe, green-go all clear and safe to proceed. There are so many different uses of the invention, anywhere it may be useful to readily indicate where an undue stress or strain has been applied.

Preferably, the first connection point is attached above a load to a load bearing apparatus or machine. Preferably the second connection point is attached to load carrying apparatus, below the safety link. The positions of the connection points can clearly be varied to suit the particular application to be made of the invention. The first and second connection points may also be reversed.

Preferably, the first connection point is connected to a first part of the lifting, winching, towing or securing apparatus or similar apparatus. Preferably, the second connection point is connected to a second part of the lifting, winching, towing or securing apparatus or similar apparatus. A D-clamp or similar may be used to enable removable connection of the first or second connection point to the apparatus. Preferably, the first connection points connects substantially between the safety link and the lifting, winching, towing or securing apparatus or similar machine. Preferably, the second connection point connects between the safety link and the load. Most preferably, the first connection point of the safety link connects to part of the lifting, winching, towing or securing apparatus or similar apparatus associate with the lifting, winching, towing or securing apparatus or similar machine and the second connection point of the safety link connects with part of the apparatus associated with the load. In other forms of the invention the safety link and connection points can be used and connected at any load bearing point to indicate overload, where it occurs.

The first connection point may take any suitable form. In the first form of the invention the first connection point may be in the form of a loop or link, similar to a chain links. In this form of the invention the second connection point may also be in the form of a loop or link. Preferably, the first connection point is a loop which may be connected to part of the lifting, winching, towing or securing apparatus or similar apparatus and the second connection point is another loop which may be connected at another point of the lifting, winching, towing or securing apparatus or similar apparatus. Preferably, the first loop is attached toward and associated with the lifting, winching, towing or securing apparatus or similar machine and the second loop with the load. The invention may also take other forms.

Most preferably, in this form of the invention, the first loop and second loop have the indicator means between them. Most preferably, in this form of the invention the indicator means is the connection between the first loop and second loop and on overload the indicator means changes shape, deforms and or separates to indicate that the overload has occurred. In one preferred form of the invention the first connection point, indicator means and second connection point are formed of a single loop of material formed into a figure of 8. Preferably, in this form of the invention the first connection point forms the first loop of the figure of 8, the second connection point forms the second loop of the figure of 8, and the centre is itself a small loop, where the loops overlay. The configuration may be as illustrated in FIG. 1, for example. In this form of the invention the indicator means is the central loop portion. The central loop portion of the indicator means remains in the figure of 8 position during normal use. However, the central loop portion substantially deforms if overloaded. Preferably, the overloading of the safety link is indicated by the central portion deforming from a central loop, or overlayed state to an open or stretched state. The normal state and overloaded state may take any suitable form. Preferably, the normal state of the indicator means is an overlaying loop formation. Preferably, the overloaded state of the indicator means is a stretched or separated state. The open, stretched or separated state will indicator to an observer that an overload has occurred and that checks should be undertaken.

Preferably, the first connection point and second connection point together are a single piece, which deforms on overloading and the deformed shape provides a visual indicator that an overload has occurred, due to the shape. Most preferably on overload the cooperating parts substantially deform and both move 90 degrees to the direction of the load.

In another preferred form of the invention, the safety link may be in the form of a rivet means or other connection. The rivet means may be used alone or with the first described form of the invention. In the rivet form of the invention the safety link may be installed in any suitable manner where it is useful to see that an overload force has been applied. Forces applied between the first connection point and second connection point in this form of the invention may be between attachment points, cables, chain links or any suitable parts of the apparatus. The forces may be where any kind of damage or overload occurs to force apart the first connection point and second connection point causing the damage to be indicated. The invention may be used anywhere it is desired to monitor and indicate overload.

Most preferably, the rivet means is used with the loop form of the invention and fits within the central loop portion. On overload of the loops and deformation of the central portion, the rivet means separates to give an indication that overload has taken place. Preferably, the rivet means has a first connection point and second connection point.

In the rivet form of the invention, the first connection point of the rivet means and second connection point of the rivet means may be installed in a point where it is desired to monitor overload. The first connection point of the rivet means may be installed between the safety link and a lifting, winching, towing or securing apparatus or similar machine or the like. The second connection point of the rivet means may be installed between the safety link and the load. The load in this case may be a lift and the safety link installed in lift apparatus to monitor for safety. The first connection point of the rivet means and second connection point of the rivet means together may be cooperating parts that fit together. The cooperating parts may have a one-piece construction, wherein, on overload the cooperating parts become deformed indicating overload. Preferably, the cooperating parts fit together in the normal state of use. Most preferably, on overload the cooperating parts substantially separate. The separation of the first connection point and connection point may be part of the indicator means. Preferably, overload on the lifting, winching, towing or securing apparatus or similar causes separation between the first connection point and the second connection point and the separation provides a clear indication that overload has occurred. Most preferably, the rivet means is installed as an indicator means.

In the rivet form of the invention the first connection point of the rivet means may be a first part with a top and substantially cylindrical body attached and the second connection point of the rivet means is adapted to cooperate and correspondingly fit into the cylinder. Preferably, in this form of the invention the second connection point of the rivet means includes a base. Preferably, the second connection point includes a substantially cylindrical body, adapted to fit within the substantially cylindrical body of the first connection point. Preferably, on overload the cylindrical bodies of the first and second connection points of the rivet means are substantially separated. In this form of the invention colours may be included on the body of the rivet part so that one colour is apparent in a normal state but after overloading or another colour is visible, indicating that an overload has occurred. Preferably, green is used to show that the rivet means is intact and red, fluorescent orange or some similar "danger" and highly visible colour is used to show the overloaded state. In this form of the invention colours may be included on the body of the cylinders so that one colour is apparent in the normal state but after overload or separation another colour shows, indicating that the overload has occurred. The overall shape may be similar to a cotton reel with two parts that may cooperate or be pulled apart. The form of the invention may be similar as to shown in FIGS. 3 and 4. The indication means, in this form of the invention may include the colour change on overload between showing the body of the first connection point and of showing the body of the second connection point.

In other forms of the invention, the first connection point and second connection point may take any suitable form. The first connection point and the second connection point may be installed in a point where it is desired to monitor overload. The first connection point may be installed between the safety link and a lifting, winching, towing or securing apparatus or similar machine or the like. The second connection point may be installed between the safety link and the load. The load in this case may be a lift and the safety link installed in lift apparatus to monitor for safety. The first connection point and second connection point together may be cooperating parts that fit together. The cooperating parts may have a one-piece construction, wherein, on overload the cooperating parts become deformed indicating overload. Preferably, the cooperating parts fit together in the normal state of use. Most preferably, on overload the cooperating parts substantially separate. The separation of the first connection point and connection point may be part of the indicator means. Preferably, overload on the lifting, winching, towing or securing apparatus or similar causes separation between the first connection point and the second connection point and the separation provides a clear indication that overload has occurred.

Any suitable cooperating parts for the first connection point and the second connection point may be used which when separated by undue load or force causes the indicator means to indicate to the observer that the force or load had occurred.

The first connection point may take any suitable form to attach to part of the apparatus. Most preferably, the first connection point attaches to part of the apparatus in connection with the lifting, winching, towing or securing apparatus or similar machine. Similarly, preferably, the second connection point may attach to part of the apparatus for lifting, winching, towing or securing apparatus or similar or carrying the load. The second connection point may attach in any suitable manner. Preferably, the overload occurs by stressing the safety link, in place between the load and the lifting, winching, towing or securing apparatus or similar which after overload indicates this to an observer. The overload may be any suitable undue stress. The overload may be where a suitable load is lifted in an inappropriate manner which puts undue strain on the apparatus. The in appropriate manner of use may include the load being lifted too quickly. The load may alternatively, lifted too far or swung such that the apparatus is unduly strained. Each of these circumstances is included within the term overload.

The indicator means may take any suitable form. Preferably, the indicator means takes the form of being a visual indicator that an overload has been put on the apparatus. Preferably, the indicator means is a visual indicator. The indicator means may indicate in any suitable manner. The indication may be chosen from the group: visual; audible; alarm; olfactory, communication; or a combination thereof. For example, most preferably, the indicator means on observation very clearly shows that there has been an overload by a visual cue. The visual indication may be chosen from the following group: colour change; shape change; stretching or deformation; or a combination thereof. Preferably, the indicator means includes a tie. Preferably, the tie includes colour. Preferably, the indicator means includes a colour change between an overloaded state and the state before overload. Preferably, the colour indicates if overload has occurred. The tie or tag may take any suitable form. Preferably, the tie or tag remain intact on normal use but will break on a predetermined overload. Preferably, the tie or tag breaks easily once a certain overload occurs, but remains intact in use. Preferably, the deformation of between the first connection point and second connection point only occurs with significant forces and if deformed the change in shape readily breaks the tie or tag which is then a clear indication that an overload has taken place. In one preferred form of the invention, overload leads to deformation of the first and second connections points, pulling them apart breaking a tie which can be readily seen as an indicator of overload. In this form of the invention deformation and absence of the tie, exposing the warning colour of red when the tie is broken provides a very strong and clear indication that an overload has occurred.

A strong smelling substance may be released on overload. A dye may be released on overload. A combination of substances and indication means may be used to alert a person that there has been an overload. For example, dye and colour change for a visual indication over a wide area and a strong smelling oil to alert if the visual indication is obscured. Where a strong smelling oil or substance is used this may have a particularly useful application for hidden points of load. In this form of the invention where a hidden point is overloaded the visual indicators may only be seen on a full maintenance inspection. However, the smell of the oil can be made from a distance, even if the join itself cannot be seen to alert that maintenance is required. In the use for lifts, use of the strong smelling oil may be particular applicable. An overload between a first connection point and a second connection point may separate and stretch a central part. The central part when stretched may open or break to release a substance. In the rivet form of the invention separation of the parts may release material, such as dye or a pungent material that can assist to indicate that an overload has taken place.

In some forms of the invention when an overload is applied, first connection point and second connection point are stretched apart deforming a central part between them. The central part deformation may be the indication means as this can be seen, to show an overload has occurred. Other features may be included in the indicator means. These may be ties which break on overload, if the tie is not present this will show that an overload has occurred. A colour of tie may be used that is easy to see. Other forms of tie may show a different colour underneath or if damaged. In each case use of colour makes it very clear on observation that an overload has been applied to the apparatus and that the apparatus needs to be checked.

It is to be noted that the deformation of the safety link is a clear indication of overload. But in the subject invention multiple layers of indication and often used to make it very clear that overload has occurred in a variety of different situations.

The overload may be any overload defined by the safety link or user. The safety link may be adapted to be used normally, and only indicate an overload when a load or force over a predetermined level is applied. For example, on a small scale operation a crane may comfortably lift 1 tonne loads but it will be determined that over 1.25 tonne is an overload. In this case the safety link will be unchanged for 1 tonne loads and the appropriate forces between the first and second connection points. However, a force of 1.25 tonne would stress the apparatus and so the safety link is adapted at that force to indicate that an overload has occurred. The predetermined "overload" limit may be set to any suitable level. Preferably, the overload limit will be set so that the indication means indicates if any risk to the apparatus has been encountered. It is envisaged that a range of safety links will be available configured for a range of suitable applications. These safety links may be able to withstand different loads and an appropriate load capacity chosen for a particular application.

Overload is a useful term to describe use when in a lifting, winching, towing or securing apparatus or similar situation. However, the invention may be used in a wide range of applications. In this case overload is to be taken to mean more than simply a greater load than capacity but may be other pulling or pushing forces for example. The overload may be any force greater than it is safe for the apparatus to undertake, and it is desired to indicate through use of the indication means.

The change in the indicator means may be anything that can indicate overload. The change may be chosen from the group; colour change; shape change; a sound; issue of a substance; a communication to a device; or a combination thereof. The change may be any suitable change. The change may be deformation of the safety link. Preferably, the change is a deformation of the safety link such that there is one or more other indicator that overload has occurred. For example, deformation may occur on overload leading to one or more of a colour change; release of dye; release of pungent oil; breaking of one or more ties; shape change; audible alarm; or communication to a device. In one preferred form of the invention overload leads to deformation of the device, breaking a tie which can be readily seen as an indicator of overload by the deformation and absence of the tie. In another form of the invention, the deformation is the separation of the first connection point and the second connection point and this enables a colour to be shown, not shown before the deformation. Preferably, in this form of the invention a substance is also released on deformation. The substance may be or include a dye. The substance may be or include a pungent oil. Preferably, in one form of the invention there is both a deformation and another form of indication that an overload has occurred. This may be deformation and the breaking of a tie or tag. Or this may be deformation and the separation of two connection points of a rivet.

Accordingly, the invention may provide in a variant, a safety link for use in lifting, winching, towing or securing apparatus or similar, the safety link including:
 a looped body formed into
 a first connection point;
 a second connection point; and
 a central part positioned substantially between and associated with the first connection point and the second connection point,
wherein, where an overload force is applied the forces between the first connection point and the second connection point deforming the looped body to cause a change in the central part, which is a visible indicator of overload whereby the change indicates the overload to the user so safety checks may be conducted.

Preferably, more than one indicator means may be included that on the deformation due to overload indicate to the user that the overload has occurred. The indicator means may be chosen from the following group: tie; cord; colour change; shape change; dye; pungent oil; audible alarm; communication to a device; or a combination thereof. Light, sound or any suitable alarm may be used with any of the aspects of the invention.

Preferably, the invention may be used in any suitable application. Preferably, the invention may be used in industrial, construction, commercial or recreational applications or in the transport industry.

Accordingly the invention may provide in a further variant, a safety link for use in lifting, winching, towing or securing apparatus or similar, the safety link including:
 a first connection point including a cylindrical body;
 a second connection point including a cylindrical body adapted to slideably fit within cylindrical body of the first connection point;
 an indicator means including a first cylindrical body, and a second cylindrical body adapted to slideably fit within the first cylindrical body and separate on overloading;
 positioned substantially between and associated with the first connection point and the second connection point,
wherein, where an overload force is applied the forces between the first connection point and the second connection point cause a change in the indicator means whereby the change indicates the overload to the user so safety checks may be conducted.

Preferably, the change is the separation of the cylindrical bodies. Preferably, a colour change is shown when there is a separation of the first and second connection points. A substance may be released on the separation. The substance may include a dye, pungent oil or other substance to assist to alert to the fact that an overload has occurred. The area between the first and second connection points, may be a central part and it is the central part that indicates that an overload has occurred.

Accordingly, the invention may provide a method of use of a safety link for lifting, winching, towing or securing apparatus or similar apparatus, the safety link including a first connection point, a second connection point, and an indication means, the method including the following steps:—
 a) using the lifting, winching, towing or securing apparatus or similar apparatus;

b) noting the indicator means in a normal state;
c) where the lifting, winching, towing or securing apparatus or similar apparatus is overloaded the safety link is caused for the indication means to change, to indicate overload'
d) observation of the indicator means of the safety link indicates to the user that the lifting, winching, towing or securing apparatus or similar apparatus has been overloaded and safety checks should be undertaken.

There may be a step before step a) of installing one or more safety link in the apparatus before use. The safety link of the method may be the safety link of the invention in any of its forms or variants.

There may be one or more safety linked in any set of apparatus. Preferably, a plurality of safety links are used at different locations about the lifting, winching, towing or securing apparatus or similar apparatus to indicate where an overload has occurred.

Preferably, the extent and location of the overload is shown through use of multiple safety links and multiple locations.

INDUSTRIAL APPLICABILITY

The invention can be manufactured industrially and supplied to the end user, retailer or wholesaler as required.

BRIEF DESCRIPTION OF THE DRAWINGS

The invention will now be described in connection with non-limiting preferred embodiments with reference to the accompanying drawings, in which.

DETAILED DESCRIPTION OF THE INVENTION INCLUDING A BEST MODE

Figure 1:
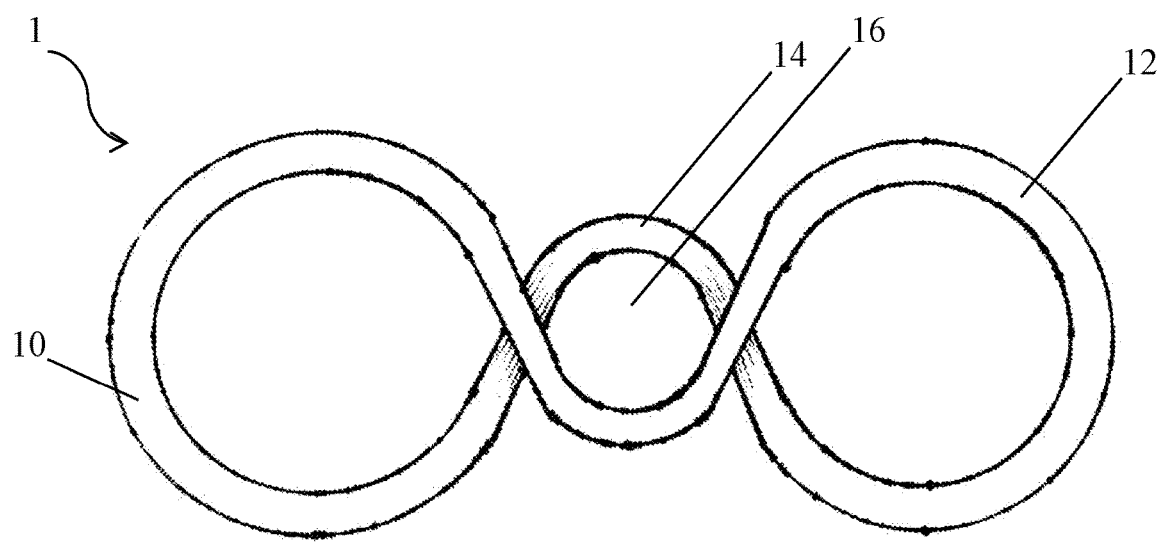
FIG. 1 is a plan view from above of a safety link according to a first preferred embodiment of the invention, the attachments and lifting, winching, towing or securing apparatus or similar apparatus generally is not shown throughout for ease of illustration.
Figure 2:
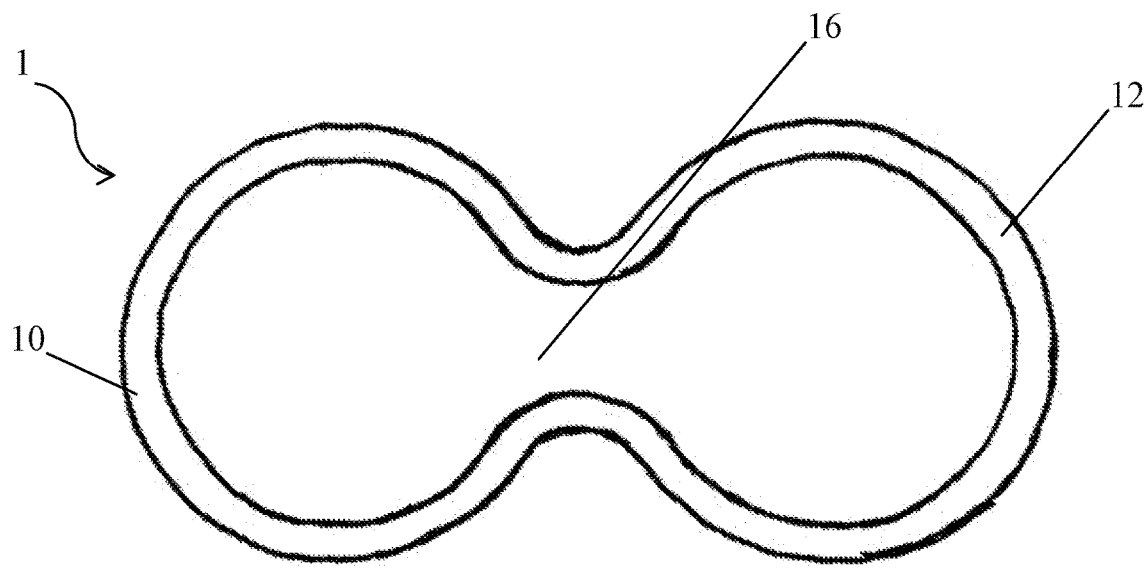
FIG. 2 is a plan view of the safety link of FIG. 1 after being overloaded, and clearly indicating this by the shape.
Figure 3:
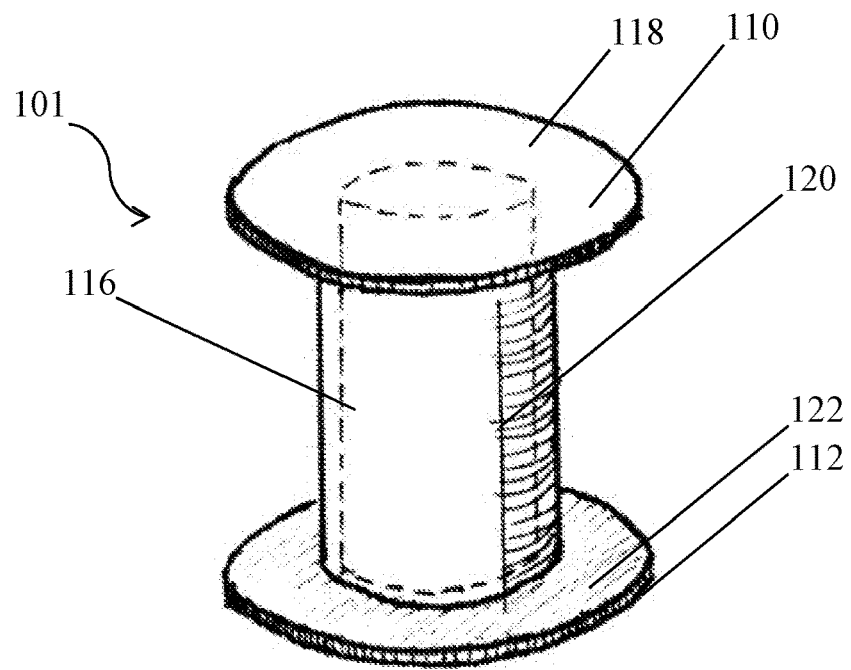
FIG. 3 is a plan view from above of a safety link according to the second preferred embodiment of the invention before the rivet is in place, the attachments and lifting, winching, towing or securing apparatus or similar apparatus generally is not shown throughout for ease of illustration.

Referring to FIGS. 1 and 2, a preferred embodiment of the invention will be described, where safety link 1 has first loop 10, second loop 12 and joining loop 14. Each of first loop 10, second loop 12 and joining loop 14 are formed of the same loop of strong alloy steel, grade 80 to 100 strength. Any suitable material may be used for safety link 1, important being that it is strong but will deform on overloading of the lifting, winching, towing or securing apparatus or similar apparatus. The lifting, winching, towing or securing apparatus or similar apparatus to which safety link 1, and the load itself are not shown in the Figures for ease of illustration. The load could be any heavy item and often are materials in the construction or mining industry, for example. Other uses may be for vehicles, boats or other lifting, winching, towing or securing apparatus or similar or stressed applications, anywhere it would be useful to know if undue strain had been applied to apparatus.

When used for standard lifting, winching, towing or securing apparatus or similar equipment safety link 1 can be incorporated during manufacture of the lifting, winching, towing or securing apparatus or similar apparatus, or may be added between parts through use of a hammer lock of D shackle. The lifting, winching, towing or securing apparatus or similar apparatus may then be used to lift parts or heavy loads from one location to another, through use of attached machinery.

FIG. 1 shows the arrangement of first loop 10, second loop 12 and joining loop 14 as in the unused, or safely used state. Central area 16 is the area of joining loop 14. Where the safety link is being used for suitable loads and no overloading has occurred safety link 1 will appear as in FIG. 1. FIG. 2, by contrast, shows an overloaded safety link 1, clearly indicating to the user that overload has occurred, the integrity is compromised and that safety checks need to take place. The shape of safety link 1 means that it deforms readily on the overload, compared to a usual chain links, so that it will indicate the overload before the chain links fail themselves.

In one example of use first loop 10 may be attached to a chain links through use of a D shackle the chain links being attached to lifting, winching, towing or securing apparatus or similar apparatus. Another D shackle may be used to attach second look 12 to a further chain links which attaches to a sling under a heavy load. The apparatus may be retrofitted to existing chains, slings, cables, or other suitable apparatus via a hammer lock or D shackle which is commonly used in the industry. Or the inventive apparatus may be included with apparatus, the invention is versatile in application.

Where the load is an appropriate weight for the chains, slings or cables and equipment, safety link 1 simply is maintained in place, part of the apparatus. However, where the lifting, winching, towing or securing apparatus or similar apparatus is overloaded it is at this point that safety link 1 becomes is used. During the overload the load that is too heavy for the apparatus is lifted and maneuvered and the chain links are put under stress. The forces between the lifting, winching, towing or securing apparatus or similar apparatus, attached to first loop 10 and the load carrying part, attached to second loop 12 will force these two loops apart. Safety link 1 is adapted to be unchanged when suitable loads and forces on the respective loops are made, however, if overloaded then deformation occurs.

As can be seen in FIG. 2 once the overload has pulled apart first loop 10 and second loop 12, joining loop 14 no longer exists, and central area 16 is open. Once the change has been observed in the indicator means, the person knows that the lifting apparatus has been overloaded and therefore can be immediately taken out of service and safety checks undertaken.

Referring to FIGS. 3 to 6 a safety rivet link 101, is included in the second form of the invention used with the safety link of FIGS. 1 and 2 of the first preferred form of the invention. The description of FIGS. 1 and 2 applies for the second embodiment and so is not reiterated here but with the safety rivet 101 included.

In use safety rivet link 101 is installed at the suitable central location, between two connection points where if overloaded there may be a safety issue. For example, safety rivet link 101 may be installed in an elevator cable (not shown) to indicate where chain links have been overloaded and stretched, very important for safety. In this application first part 10 is connected to a first part of the elevator cable which may be attached to the lifting, winching, towing or securing apparatus or similar apparatus above. Second part 14 is attached to another cable or to the lift itself, eg between the chain links. The forces between first part 10 and second part 12 in normal use would appear as in FIG. 1, no overload has occurred. Once overload occurs the apparatus will appear as in FIG. 2. The deformation in this form of the invention does more than deform however, it causes the separation of the two parts or safety rivet 101. For example, in this form of the invention it may be installed in a elevator cable, or connected to another part of the elevator cable, another cable or the lift itself. The form of the invention may be useful in natural disasters such as earthquakes to indicate undue stress and strain on chain links. When used to suspend a high voltage power lines, for example, the line may have been challenged by a storm, tornado, or cyclone, or hit by a falling tree. In which case use of the invention is very useful to indicate the need for safety checks when the extent of the damage may not be immediately evident. Other examples, may also be use on sailing vessels to indicate when the mast rigging or bracing stay cables have been overloaded during adverse weather or sailing conditions.

Figure 4:
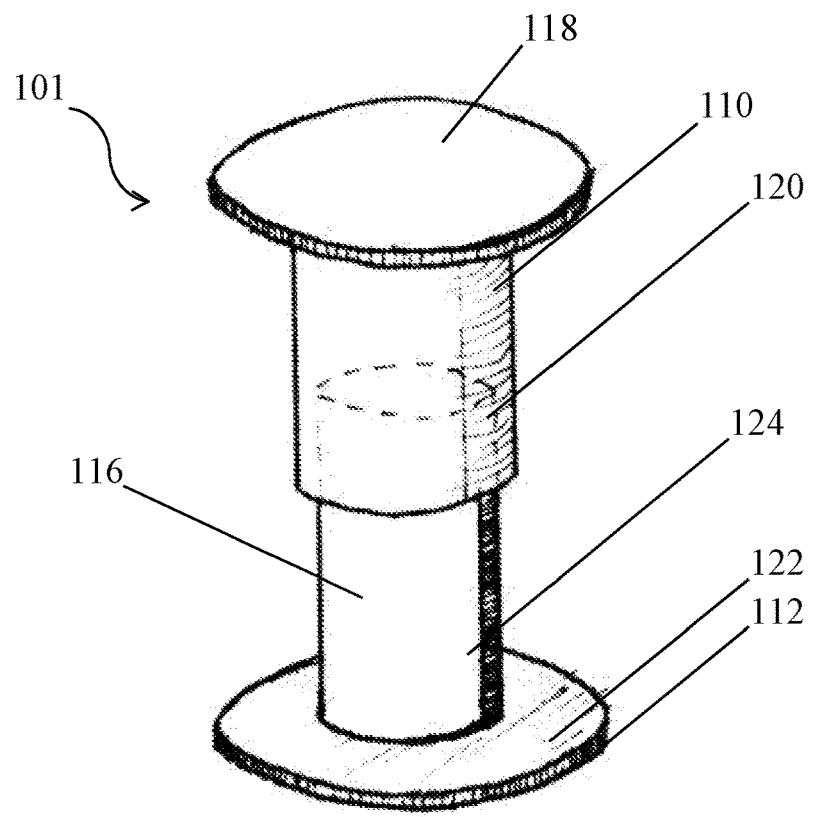
FIG. 4 is a plan view of the safety link of FIG. 3 after the rivet has been put in place.
Figure 5:
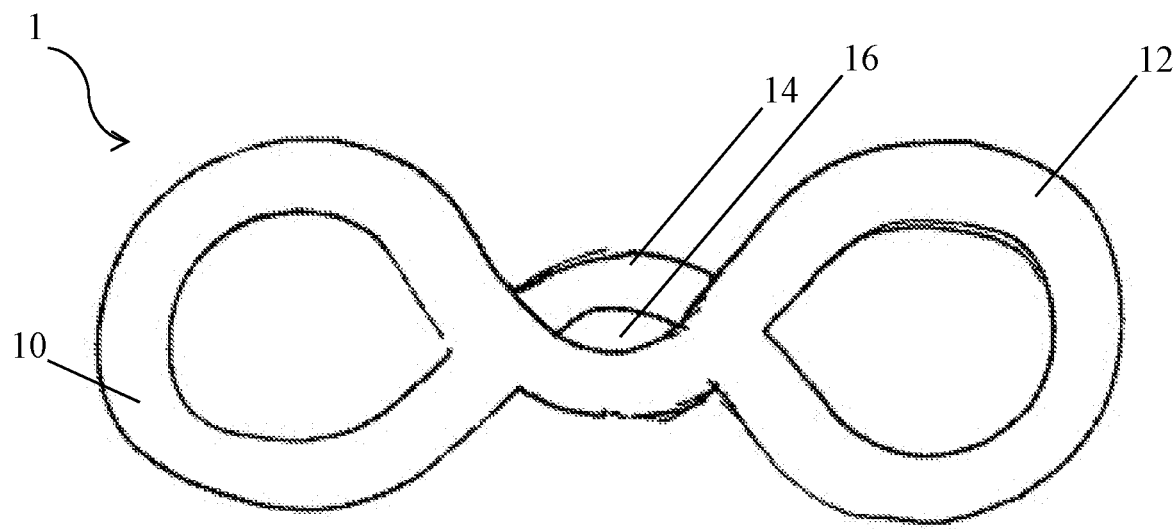
FIG. 5 is a perspective front view of the rivet of the safety link of FIG. 4.
Figure 6:
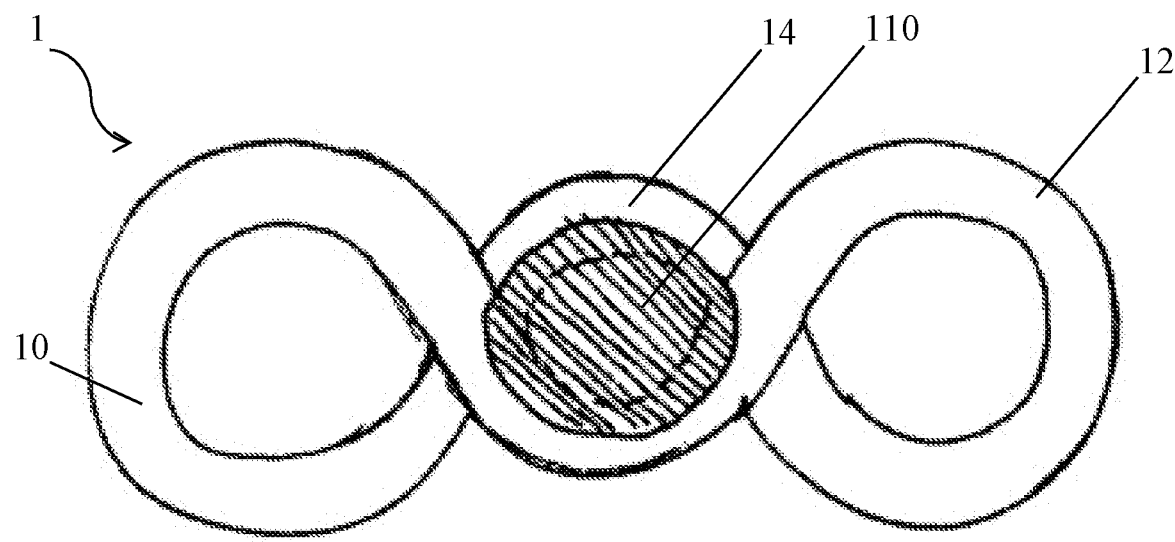
FIG. 6 is a perspective front view of rivet of FIG. 5, after being overloaded, and clearly indicating this by the deformed shape, and colour shown.

Referring to FIG. 4, where the integral safety rivet link 101 when overloaded, crushed or ruptured in any way the design is such that this provides a clear indication, similar to an emergency glow stick to give out a pungent oil and dye to be visually and by smell, detectable. In a lift for example, a person can smell the oil even when the chains themselves are hidden.

Turing in more detail to safety link 101, first part 110 has head 118 and cylinder 120. Part 112 has head 122 below with cylinder 124. Cylinder 120, in the normal use covers cylinder 124, and so only the colour of cylinder 120 will be seen. The colour is a safe colour such as green, that the rivet is integral. Cylinder 124, as is only revealed on overload or excess stress coloured a danger colour red to provide a clear visual indication that there has been an overload, danger exists and the apparatus needs to be checked. On the overload, as shown in FIG. 4 not only are the two parts pulled apart, these show the danger colour. A cover, tag or band may be included in this form of the invention as well to show that damage has occurred however slight, and to show that inspection is required. A highly visible dye used with the oil or separately can also show where the damage or overload has occurred and where the checks need to be concentrated. Oil or dye or other indications are maintained in the central region 116, similar to the central, joining region of the first embodiment. On overload and pulling apart it is from this central or joining region that the oil or dye may be released further indicating that overload has occurred.

Figure 7:
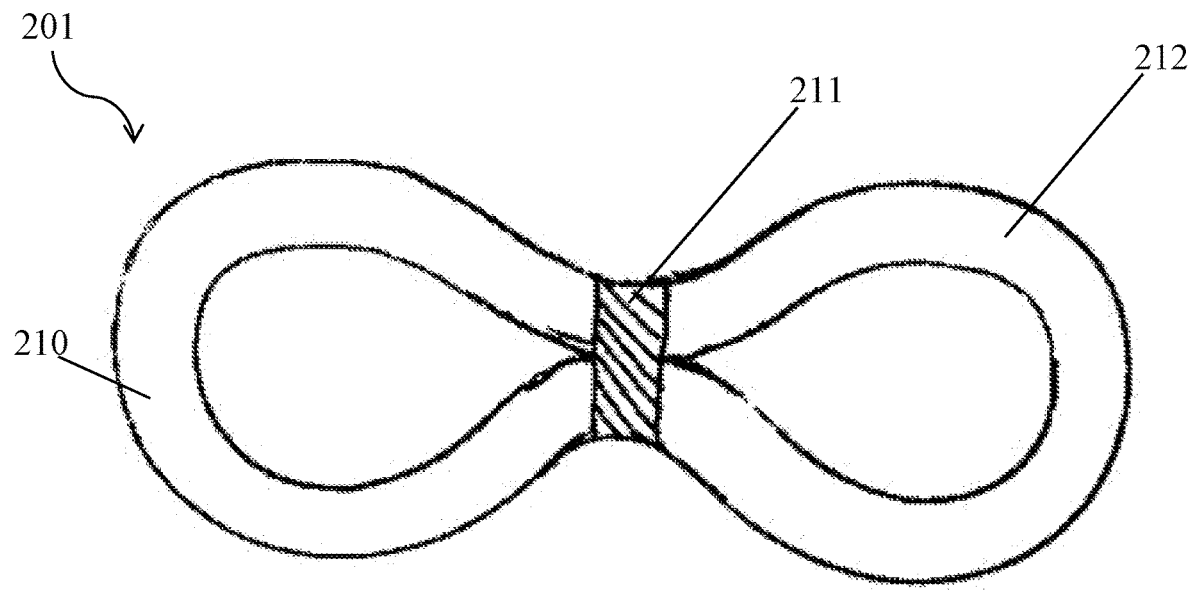
FIG. 7 is a plan view from above of a safety link according to a third preferred embodiment of the invention, similar to the first and second but including a tag, the attachments and lifting, winching, towing or securing apparatus or similar apparatus generally is not shown throughout for ease of illustration.
Figure 8:
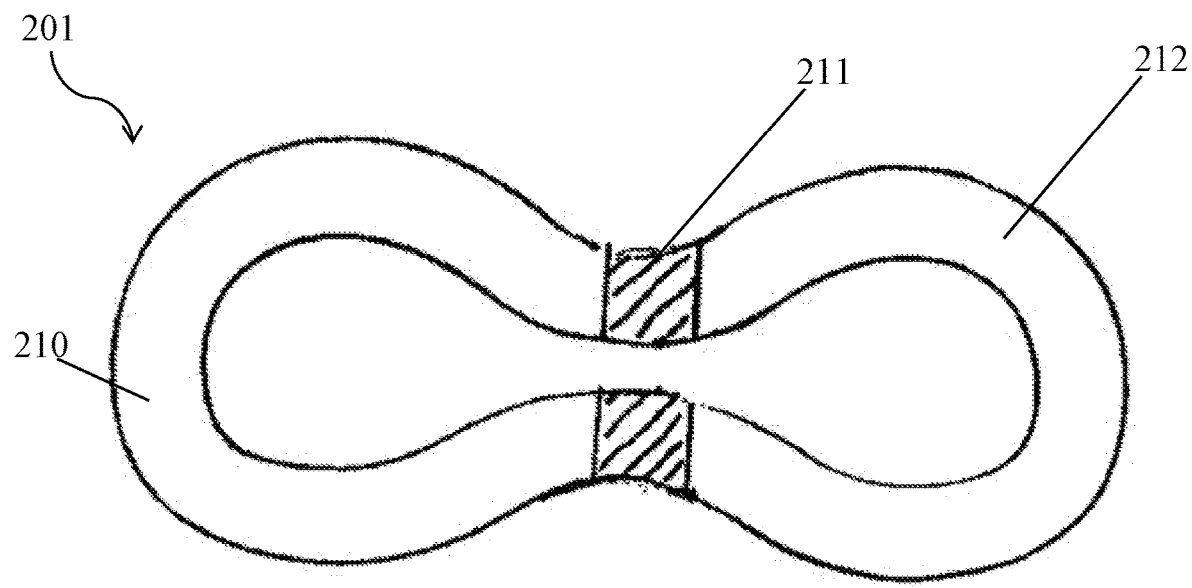
FIG. 8 is a plan view of the safety link of FIG. 7 after being overloaded, and clearly indicating this by the broken tag.

Referring to FIGS. 7 and 8, instead of a "figure of 8 shape", a tie is used, which breaks on overload. In this form of the invention, the method of use and apparatus is the same excepting the shape. Safety link 201 has first loop 210, cable tie 211 and second loop 212. Cable tie 211 may be replaced by a plastic tie, tag or strip or other restraint may be included in the central location of safety link 1. As illustrated cable tie 211 is a metal tag of green. In this form of the invention on overload the cable tie 211 or other restraint will be ruptured on overload. There is a clear visual indicator in this form of the invention that overload has occurred. For example, if cable tie 211 is broken overload the apparatus must be checked. As a further indication the area usually covered by cable tie 211 is a bright colour, red as illustrated so that this can easily be seen to indicate overload, in addition to the broken cable tie 211. Tags, bands or strips could all be used in this manner. Once overloaded, the first and second parts deformed the move causes the tag, band or strip to break, which can be easily seen, a clear indication of the overload. Cable tie 211 is included about the central portion of safety link 201, between first loop 210 and second loop 212. In normal use this restraint may be seen clearly as, a green colour perhaps, when broken and this green colour is no visible this will indicate that overload has occurred and the integrity of the apparatus may be compromised. In another form the colour used to indicate a safe state, for example green, may be broken to reveal another colour, such as the danger colour red to visually indicate that there has been an overload.

A combination of ties, tags and other indicators, including the shape and form of the safety link itself may all provide cues to the user that an overload has occurred and the apparatus should be inspected.

In any of the forms of the invention one or more indicators may be used to indicate that there has been an overload. The indicator may be the shape of the link, there may be use of ties that may be broken or lost in the case of overload. Coloured restraints or ties may be used, showing only in a safe situation or changing the colour shown in overload has occurred. Other safety measures may be included all to assist for the operator to become aware of the overload. For example, a pungent oil may be exuded from the safety link if overloaded to help bring the matter to attention. A dye may be included in the oil, or a dye may be used on its own from the safety link to show it has been overloaded. Other forms such as back to base electronic indications, lights or sounds could also be used.

It will be apparent to a person skilled in the art that changes may be made to the embodiments disclosed herein without departing from the spirit and scope of the invention in its various aspects.

REFERENCE SIGNS LIST

| | |
|---|---|
| 1 | Safety Link |
| 10 | First loop |
| 12 | Second loop |
| 14 | Joining loop |
| 16 | Central area |
| 101 | Safety rivet link |
| 110 | First part |
| 112 | Second part |
| 116 | Central region |
| 118 | Head of 110 |
| 120 | Cylinder of 110 |
| 122 | Head of 112 |
| 124 | Cylinder of 112 |
| 201 | Safety Link |

| | |
|---|---|
| 210 | First loop |
| 211 | Tie |
| 212 | Second loop |

The invention claimed is:

1. A safety link for use in lifting, winching, towing or securing apparatus or similar, the safety link including:
  a first connection point;
  a second connection point; and
  an indicator means positioned substantially between, and associated with, the first connection point and the second connection point,
  wherein, the first connection point and second connection point together form substantially a single piece, arranged to include an overlaying part, the overlaying part being part of the indicator means, and the overlaying part deforms on overloading beyond the predetermined overload limit such that the deformed shape provides a visual indicator that an overload has occurred, and wherein the indicator means further includes one or more chosen from the group consisting of tie or cord breaking, release of pungent oil, audible alarm, and light alarm.

2. The safety link of claim 1, wherein the first connection point, overlaying part of the indicator means and second connection point are formed substantially of a single loop of material formed into a figure of 8 and the centre is itself a small loop, whereby the loops overlay.

3. The safety link of claim 2, wherein the overlaying part of the indicator means is the central loop portion and the central loop portion remains in the figure of 8 position during normal use, and the central loop portion substantially deforms if overloaded to provide a visual indication of overload.

4. The safety link of claim 1, wherein the indication means includes the deformation of the overlaying parts of the first connection point and the second connection point, and a deformed, stretched or separated state of the overlaying parts indicates that an overload has occurred and that checks should be undertaken.

5. A safety link for use in lifting, winching, towing or securing apparatus or similar, the safety link including:
  a first connection point;
  a second connection point; and
  an indicator means positioned substantially between, and associated with, the first connection point and the second connection point,
wherein, the first connection point and second connection point together form substantially a single piece, arranged to include an overlaying part, the overlaying part being part of the indicator means, and the overlaying part deforms on overloading beyond the predetermined overload limit such that the deformed shape provides a visual indicator that an overload has occurred, and the indicator means, including the overlaying part, indicates an overload to the apparatus so safety checks may be conducted, and wherein the indicator means includes a rivet means and the rivet means is caused to change on overload to provide a further indication that overload has taken place and that safety checks are required.

6. The safety link of claim 5, wherein the rivet means is used with the overlaying parts of the first connection point and second connection point, and fits within a central loop portion, and on overload and deformation of the central loop portion, the rivet means separates, and the separated parts of the rivet means provides a further visual indication that overload has taken place.

7. The safety link of claim 5, wherein the rivet means has a first part and second part adapted to cooperate and correspondingly fit together, the first part including a top and substantially cylindrical body attached, and the second part including a base and a substantially cylindrical body, adapted to fit within the substantially cylindrical body of the first part, and further wherein on overload the cylindrical bodies of the first and second parts of the rivet means are substantially separated and provide an indication that overload has occurred.

8. The safety link of claim 5, wherein a first colour and a second colour are included on one or more of the cylindrical bodies of the rivet means so that the first colour is visible in a normal state and the second colour is visible after overloading, indicating that an overload has occurred.

9. The safety link of claim 5, wherein the rivet means includes one or more indication chosen from the following group: colour change; shape change; stretching or deformation; audible alarm; light alarm; olfactory indication; or a combination thereof.

10. The safety link of claim 5, wherein the rivet means on overload releases any one or more of: dye; pungent oil; and coloured materials to assist to indicate that an overload has occurred and safety checks should be undertaken.

11. A safety link for use in lifting, winching, towing or securing apparatus or similar, the safety link including:
  a first connection point;
  a second connection point; and
  an indicator means positioned substantially between, and associated with, the first connection point and the second connection point,
wherein, the first connection point and second connection point together form substantially a single piece, arranged to include an overlaying part, part of the indicator means, and the overlaying part deforms on overloading beyond the predetermined overload limit such that the deformed shape provides a visual indicator that an overload has occurred, and wherein the indicator means includes a tie or tag which remains intact on normal use but will break on a predetermined overload.

12. The safety link of claim 11, wherein the tie or tag includes colour or a colour change between an overloaded state and the state before overload.

13. The safety link of claim 11, wherein the indicator means also includes a strong smelling substance, oil or dye being released on overload.

14. The safety link of claim 11, wherein the indicator means includes multiple indications to make it very clear that overload has occurred in a variety of different situations.

* * * * *